United States Patent Office 3,473,518
Patented Oct. 21, 1969

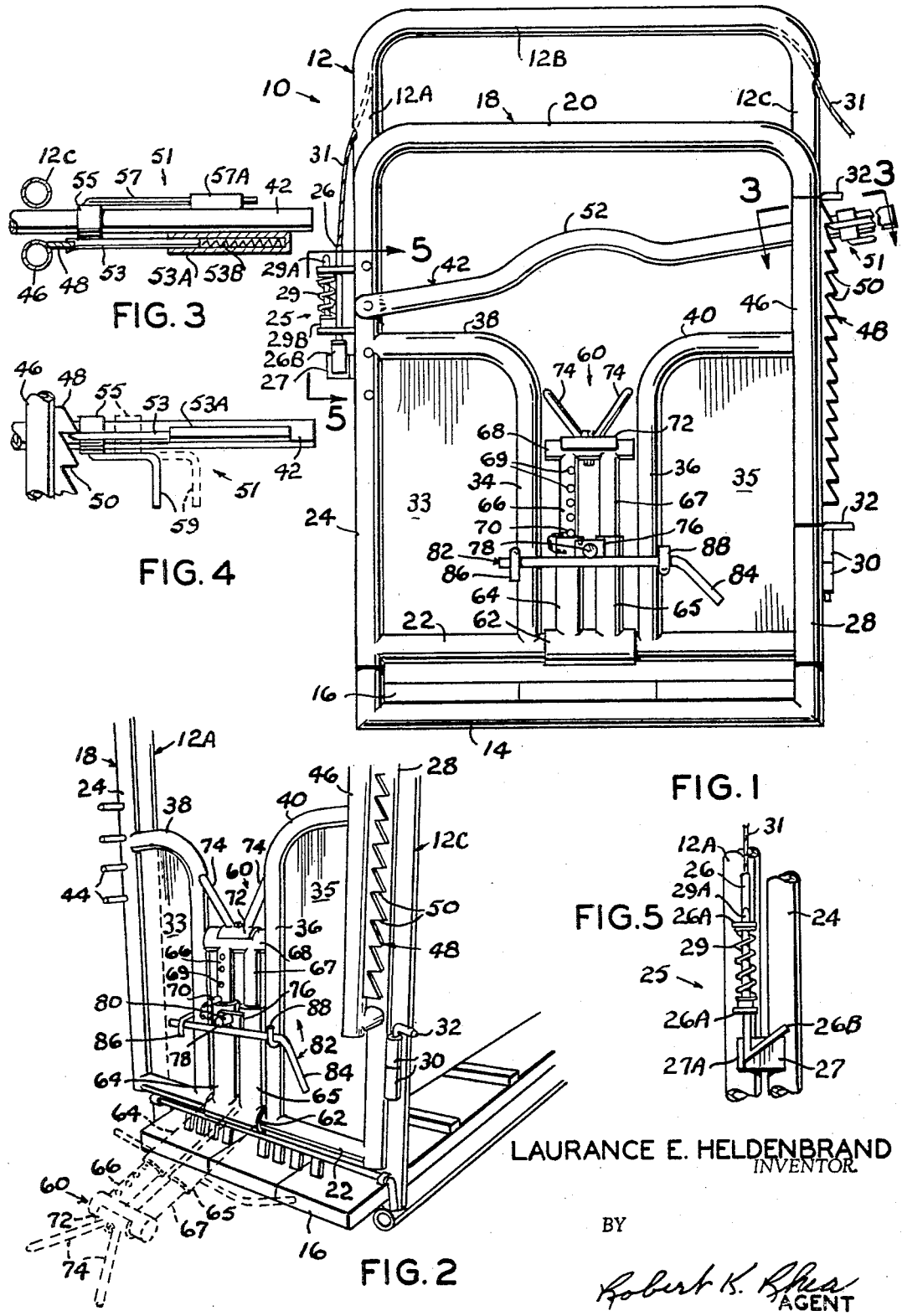

3,473,518
LOWER NECK PIECE FOR CATTLE
CHUTE HEAD GATE
Laurance E. Heldenbrand, 1012–14 S. Agnew,
Oklahoma City, Okla. 73108
Filed Nov. 15, 1967, Ser. No. 683,178
Int. Cl. A61d 3/16; A01k 67/00
U.S. Cl. 119—98                                     3 Claims

ABSTRACT OF THE DISCLOSURE

A sleeve rotatably surrounds a lower cross member of a cattle chute head gate between animal neck guiding standards to form a hinged connection. A pair of pipes are secured to the sleeve in parallel upstanding relation. A pair of posts, interconnected at one end by a cross bar, are telescopingly received by their end portions in vertically adjustable relation by the pipes. V-shaped upwardly diverging rods, connected with the cross bar, support an animal's neck when placed therein. A latch rod, pivotally connected to the pipes adjacent their upper ends, releasably secures the lower neck piece in closed position by upwardly and downwardly open sockets formed respectively on the neck guiding standards of the cattle chute head gate.

BACKGROUND OF THE INVENTION

The present invention relates to cattle chutes and more particularly to a lower neck piece for a cattle chute head gate.

The forward end of a cattle chute frame is usually provided with an open-frame end member or head gate which is hingedly secured at one side to a frame post of the cattle chute and releasably latched at its other side to the other forward post of the cattle chute frame.

This invention is an improvement over my Patent No. 2,714,872, issued Aug. 9, 1955, for Head Gate for Cattle Chute.

The present invention performs the same function as the gate of the above patent but the lower neck piece of the head gate of the patent contains two disadvantages. One disadvantage being the manner of adjusting the lower neck piece vertically which was accomplished by a pair of set screws engaging the telescoping posts whereas, in my improved version, a plurality of holes are provided in one telescoping post for receiving a pin which permits quicker and easier adjustment and a more positive fixed position. Secondly, the lower neck piece of the patent discloses a release rod which must be withdrawn from within a pair of transversely aligned tubular members which is not easily done when the neck piece is supporting an animal's neck after the animal has fallen or is down in the chute.

It is well known by those skilled in the art that, when working range cattle in a chute, the animal frequently falls, as a result of fear and in an effort to escape. When the animal falls the neck supporting piece or yoke, being positioned to fit the animal while standing, tends to choke the animal. The lower neck piece must then be quickly released to allow the animal to breathe and regain its feet.

The present invention provides a lower neck piece release rod pivotally connected intermediate its ends to the lower neck piece and supported at its respective ends in releasable locking relation by a pair of upwardly and downwardly open sockets, respectively.

SUMMARY OF THE INVENTION

The forward or head gate of a cattle chute is normally closed and is provided in its lower end portion with a pair of spaced-apart animal neck receiving standards connected at their depending ends to a cross member. These standards are turned laterally outward and connected with the respective side posts forming the cattle chute head gate intermediate their ends. A pair of pipes are pivotally connected to the cross member and telescopingly receive a pair of posts interconnected, at their upper ends, by a short cross bar extending transversely between the standards. A substantially V-shaped member or yoke, connected to the short cross bar, supports an animal's neck. A latch rod, pivotally connected to the pair of pipes, is releasably secured at its respective end portions by upwardly and downwardly open sockets formed, respectively, on the standards. Manual release of the latch rod permits the head gate to be swung forwardly of the cattle chute in an "out of the way" and animal neck releasing position.

This head gate provides a means for quickly adjusting the vertical position of its animal neck supporting portion or yoke and a quick release for pivoting it toward the earth's surface forwardly of the cattle chute.

It is, therefore, the principal object of this invention to provide a lower neck piece for a cattle chute head gate which may be easily and quickly adjusted vertically and which may be easily released from an animal neck supporting position by simply pivoting a latch rod out of its locked position.

BRIEF DESCRIPTION OF THE DRAWINGS

FIGURE 1 is a front elevational view of a cattle chute having the head gate shown in normal operating position;

FIGURE 2 is a perspective view, to a smaller scale, of the cattle chute shown by FIG. 1 and illustrating, by dotted lines, the lower neck piece when pivoted forwardly of the cattle chute;

FIGURE 3 is a fragmentary top view, partially in horizontal section, looking in the direction of the line 3—3 of FIG. 1;

FIGURE 4 is a side elevational view of FIG. 3; and

FIGURE 5 is a fragmentary elevational view looking in the direction of the line 5—5 of FIG. 1.

DESCRIPTION OF THE PREFERRED EMBODIMENT

Like characters of reference designate like parts in those figures of the drawings in which they occur.

In the drawings:

The reference numeral 10 indicates the forward end portion of a cattle chute frame including a forward inverted U-shaped main frame pipe member 12 having its legs 12A and 12C interconnected at their depending ends by a cross member 14 which supports the forward end portion of a floor 16. A similar shaped frame forming a front end or head gate 18 includes an inverted U-shaped pipe or frame member 20 having its legs 24 and 28 interconnected by a transverse cross member 22. Gate latch means 25 releasably connects the leg 24 of the gate member 20 to one leg 12A of the cattle chute frame 12. The gate latch means 25 comprises an elongated latch pin 26 extending vertically slidable through aligned apertures formed in spaced horizontal outstanding lugs 26A secured to the frame leg 12A intermediate its ends. A striker plate 26B is secured to the depending end of the latch pin 26. The striker plate 26B extends angularly forward and upward of the forward limit of the frame leg 12A. A latch plate 27 is secured to the gate leg 24. The plate 27 projects rearwardly of the gate leg 24 toward and beyond the vertical axis of the pin 26 where it is turned, at right angle, as at 27A, to project outwardly of the frame leg 12A rearwardly of the depending end of the pin 26 and striker plate 26B. The plate end portion 27A thus contacts the striker plate 26B in a camming action to lift the latch pin 26 and latch the gate 18 in a closed position when closing the gate. The pin 26 is maintained in gate latched position by a spring 29 interposed between the lugs 26A and surrounding a spring pin 29A.

The spring pin 29A is disposed in parallel outwardly offset relation with respect to the latch pin 26 and is secured, at its depending end, to a collar 29B in turn welded to the latch pin 26 above the lowermost leg 26B. The upper free end portion of the spring pin 29A projects vertically slidable through an aperture formed in the upper lug 26A. The latch pin 26 is raised or lifted, to release or unlatch the gate leg 24 by a flexible member, such as a cable 31, which is secured at one end to the upper limit of the latch pin 26. The cable 31 extends through a suitable opening in the frame leg 12A, through the bight portion 12B of the frame pipe member 12 and out through a similar opening in the other frame leg 12C. The other gate leg 28 is hingedly connected to the other frame leg 12C by pairs of vertically aligned tubular members 30, respectively, connected with the frame leg 12C and gate leg 28. Each respective pair of the members 30 removably receive a hinge pin 32. The end gate 18 may thus be swung horizontally toward and away from the chute frame 12 in an opening and closing action by pivoting movement about the vertical axis formed by the hinges 30. The purpose of the releasable hinge pins 32 is to permit removal of the head gate 18. The head gate 18 is provided with a pair of parallel spaced-apart upright animal neck guiding members or standards 34 and 36 connected at their depending ends with the cross member 22 and turned horizontally outward at their upper end portions 38 and 40, respectively, in horizontally aligned relation and connected with the respective gate legs 24 and 28. The space between the standards and the respective gate leg 24 and 28 is closed by sheet metal plates 33 and 35, respectively. The gate 18 is further provided with an upper neck piece comprising a bar or tube 42 pivotally connected at one end with a selected one of a plurality of vertically spaced-apart pins 44 secured to and projecting horizontally forwardly of the gate leg 24. The other or free end portion of the bar 42 extends beyond the forward surface of the other gate leg 28 and rearwardly of a false leg 46, secured in parallel forwardly spaced relation at its respective ends to the gate leg 28, for vertical movement of the free end portion of the bar 42. A keeper bar 48 is secured to the false leg 46 and is provided with a plurality of vertically spaced ratchet-like notches 50 for locking the bar 42, against upward movement, in a selected position.

Ratchet latching means 51 is connected with the free end portion of the bar 42 (FIGS. 3 and 4) comprising a ratchet rod 53 secured, at one end portion in parallel relation with respect to the bar 42, to a collar 55 slidably surrounding the bar 42 outwardly of the chute frame. The end of the ratchet rod 53, projecting beyond the collar 55 toward the ratchet bar 48, is flattened for cooperative engagement with the respective notches 50. The other end portion of the ratchet rod 53 is slidably received by a tubular socket 53A secured to the bar 42. A spring 53B is contained by the socket 53A and bears against the adjacent end of the ratchet rod 53 for urging its opposite flattened end into engagement with one of the notches 50. A ratchet guide rod 57 is secured, by one end portion, to the collar 55 diametrically opposite the ratchet rod 53 in parallel spaced relation with respect to the bar 42. The other end portion of the ratchet guide rod 57 is slidably received by a ratchet guide sleeve 57A secured to the bar 42 opposite the tubular socket 53A. A right angular shaped rod-like handle 59 is connected, by one of its leg members, to the lowermost surface of the collar 55 with its other leg member projecting downwardly. Thus downward movement of the free end portion of the bar 42 moves the flattened end portion of the ratchet rod 53 along the vertical row of ratchet notches 50. The ratchet latching means 51 is released, for upward movement of the free end portion of the bar 42, by manually pulling the handle 59 toward the free end of the bar 42. The bar 42 is provided intermediate its ends with an arcuate upwardly extending bowed portion 52 in vertical alignment with the spacing between the upright animal neck guiding standards 34 and 36 for engaging and holding the upper portion of an animal's neck as presently explained.

The above description of cattle chute construction is set forth to show the components of a head gate with which the present invention is intended to cooperate.

My improved lower neck piece, indicated generally by the numeral 60, comprises a vertical adjustable neck engaging and supporting yoke for an animal to be held.

In carrying out the invention a tube 62 rotatably surrounds the cross member 22 between its connection with the neck guiding standards 34 and 36. A pair of pipes 64 and 65 are connected at one end in parallel spaced relation to the tube 62. Diametrically the size of the pair of pipes 64 and 65 is preferably such that the spacing therebetween and on either side, between the standards, is less than the size of a leg of an animal to be held, thus substantially closing the spacing between the parallel portions of the standards 34 and 36. The length of the pipes 64 and 65 is preferably less than one-half the vertical extent of the standards 34 and 36. A pair of posts 66 and 67 are rigidly connected at their upper ends to a short cross bar 68 having a length slightly less than the spacing between the standards 34 and 36. The spacing between the pair of posts 66 and 67 is such that they may be cooperatively received in telescoping relation by the pair of pipes 64 and 65 and their length is slightly greater than the length of the pipes. One of the pair of posts, for example, the post 66 is provided with a plurality of vertically spaced diametrically extending apertures 69 for removably receiving a pin 70 to maintain the telescoping position of the posts within the pipes in a selected adjustment. A curved plate 72 is removably secured to the upwardly disposed peripheral portion of the short cross bar 68. A pair of tubular or rod-like arms 74 are secured at one end to the curved plate 72 and extend upwardly and outwardly in diverging relation terminating in a close spaced relation with respect to the innermost limit of the respective standard 34 and 36. The arms 74 thus form an animal neck supporting yoke. A plate 76 extends between and is secured to the forward upper end portions of the pair of pipes 64 and 65. A bolt 78 extends forwardly of the plate 76 and journals a sleeve 80. A latch rod 82 is secured intermediate its ends to the sleeve 80 and projects horizontally beyond the limit of the respective standard 34 and 36 and is turned down at one end portion to form a handle 84. A rod 86 is secured to the standard 34 and extends forwardly therefrom and is turned arcuately downward in spaced relation with respect to the forward surface of the standard 34, as shown more clearly in FIG. 2. Similarly a second rod 88 is secured to the standard 36 and extends forwardly therefrom and is turned arcuately upward. The downwardly and upwardly turned end portions of the rods 86 and 88, in combination with the respective standard 34 and 36, thus form respective downwardly and upwardly open sockets which receive the respective end portions of the latch rod 82.

OPERATION

In operation the lower neck piece 60 is positioned, as shown by solid lines, and its telescoping members are vertically adjusted by the pin 70 to position the neck yoke arms 74 at a selected elevation in accordance with the size of the animal to be held thereby. When the animal, not shown, is placed within the chute the neck arms 74 are then in close spaced relation or in supporting position with respect to the neck portion of the animal. The neck bar 42 is manually pulled downwardly so that the arcuate portion 52 engages the upper surface of the animal's neck while the ratchet rod 53 is engaged with one of the keeper bar notches 50 thus clamping the animal's neck between the bar 42 and yoke arms 74. When it is desired to release the lower neck piece 60, as for example, when an animal is down in the chute and choking, the latch rod handle 84 is manually raised to pivot the latch rod about the horizontal axis formed by the bolt 78 to release the latch rod from the socket forming rods 86 and 88 thus permitting the lower neck piece 60 to pivot, about the horizontal axis of the cross member 22, forwardly of the cattle chute to the position shown by dotted lines (FIG. 2).

Obviously the invention is susceptible to some change or alteration without defeating its practicability.

I claim:

1. In combination with a cattle chute having a main frame, a head gate hingedly connected, for horizontal swinging movement, to one end of said main frame, said head gate partially closing an end of said main frame and having a lower cross member connected with a pair of spaced-apart upwardly and laterally extending standards between which an animal's neck is placed, a vertically adjustable lower neck piece comprising a pair of posts telescopingly received by a pair of pipes mounted on said cross member between the standards for vertical swinging movement, an upper neck piece pivotally mounted on the end gate above said head gate cooperating with the lower neck piece in gripping an animal's neck, the improvement comprising: pin means maintaining said telescoping members in selected extending relation; and latch rod means releasably supporting said lower neck piece against vertical pivoting movement in either direction, said latch rod means comprising a plate extending transversely between and secured to the upper forward end surfaces of said pipes, a bolt secured to and projecting forwardly of said plate, a sleeve journaled by said bolt, a latch rod secured, intermediate its ends, to said sleeve and projecting at its respective ends, beyond the lateral limits of the upright portions of said standards, said standards each having a forwardly projecting rod secured thereto forming a latch rod end portion receiving socket.

2. Structure as specified in claim 1 and ratchet latching means normally preventing upward movement of the free end portion of said upper neck piece, comprising, a keeper bar secured to one side of said head gate, said keeper bar having a series of vertically spaced ratchet-like notches, a collar slidably surrounding said upper neck piece, a ratchet rod secured to said collar and having an end portion releasably engaging said ratchet notches, a tubular member secured to said upper neck piece and forming a socket surrounding the other end portion of said ratchet rod, a spring within the socket and bearing against the adjacent end of said ratchet rod for normally urging the latter into engagement with the notches of said keeper bar, and a handle connected with said collar for releasing said ratchet rod.

3. Structure as specified in claim 1 and gate latch means normally holding said head gate in a closed position, comprising, vertically spaced alignedly apertured lugs horizontally secured to said main frame adjacent the side of said head gate opposite said keeper bar, a latch pin extending through the apertures in said lugs, a striker plate secured to the depending end of said latch pin, said striker plate having an inclined camming surface facing forwardly of said chute, a guide pin secured at one end to said latch pin above the lowermost said lug and projecting upwardly, at its other end portion, through the upper said lug, a spring surrounding said guide pin between said lugs, a latch plate secured to the last named side of said head gate and cooperating with said striker plate and latch pin during the closing action of said head gate, and means for lifting said latch rod and releasing said latch plate.

References Cited

UNITED STATES PATENTS

| 2,136,008 | 11/1938 | Gregory | 119—98 |
| 2,714,872 | 8/1955 | Heldenbrand | 119—98 |
| 3,020,882 | 2/1962 | Browning | 119—82 |

FOREIGN PATENTS

| 944,998 | 12/1963 | Great Britain. |

ALDRICH F. MEDBERY, Primary Examiner